United States Patent
Lönn

(10) Patent No.: US 7,724,296 B2
(45) Date of Patent: May 25, 2010

(54) DEVICE AND METHOD FOR ADJUSTING IMAGE ORIENTATION

(75) Inventor: Fredrik Alexander Lönn, Södra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 779 days.

(21) Appl. No.: 11/425,395

(22) Filed: Jun. 21, 2006

(65) Prior Publication Data

US 2007/0296820 A1    Dec. 27, 2007

(51) Int. Cl.
*H04N 5/222* (2006.01)

(52) U.S. Cl. .................. 348/333.12; 348/207.99; 348/239; 348/333.01

(58) Field of Classification Search .......... 348/14.01, 348/239, 333.01, 333.12, 207.99
See application file for complete search history.

(56) References Cited

U.S. PATENT DOCUMENTS

| | | | |
|---|---|---|---|
| 5,900,909 A | | 5/1999 | Parulski et al. |
| 5,933,527 A | * | 8/1999 | Ishikawa .................... 382/190 |
| 6,148,149 A | | 11/2000 | Kagle |
| 7,269,292 B2 | * | 9/2007 | Steinberg ................... 382/243 |
| 7,492,924 B2 | * | 2/2009 | Rodyushkin et al. ........ 382/115 |
| 2004/0017506 A1 | | 1/2004 | Livingston |
| 2005/0036044 A1 | * | 2/2005 | Funakura .................... 348/239 |
| 2007/0139513 A1 | * | 6/2007 | Fang ....................... 348/14.01 |
| 2008/0239131 A1 | * | 10/2008 | Thorn ................... 348/333.01 |

FOREIGN PATENT DOCUMENTS

| | | |
|---|---|---|
| EP | 1507386 | 2/2005 |
| EP | 1560421 | 8/2005 |
| WO | 01/31893 | 5/2001 |
| WO | 2004/015986 | 2/2004 |

OTHER PUBLICATIONS

Senior, Andrew W., "Face and feature finding for a face recognition system", In proceedings of the Second International Conference on Audio- and Video-based Biometric Person Authentication, pp. 154-159, Washington D.C., Mar. 1999.

* cited by examiner

*Primary Examiner*—Jason Chan
*Assistant Examiner*—Usman Khan
(74) *Attorney, Agent, or Firm*—Renner, Otto, Boisselle & Sklar LLP

(57) ABSTRACT

A camera device (1) comprising a support structure (10), a primary camera (16) carried by the support structure, and a secondary camera (15) carried by the support structure. When the primary camera (16) is operated to capture an image of an object, the secondary camera (15) captures an image of a user of the camera device (1). An orientation detector (17) is connected to the secondary camera (15), configured to identify images features in the image captured by the secondary camera, such as the eyes and mouth of the user, and to determine rotation orientation of the image relative to a reference orientation. A data storing device (20, 21) is configured to store image data of images captured by the primary camera in an orientation dependent on determined rotation orientation. This way all images may be stored in a common orientation, regardless of which orientation the camera device was held in when the images were captured.

30 Claims, 3 Drawing Sheets

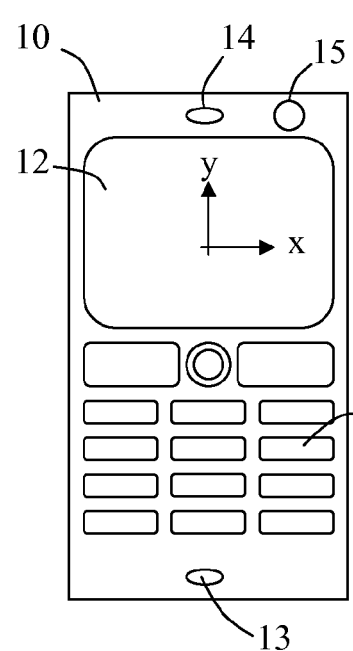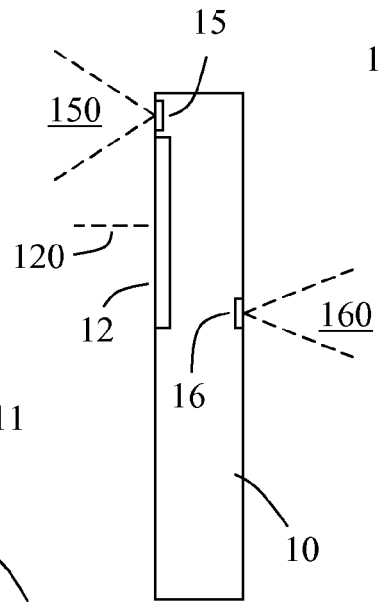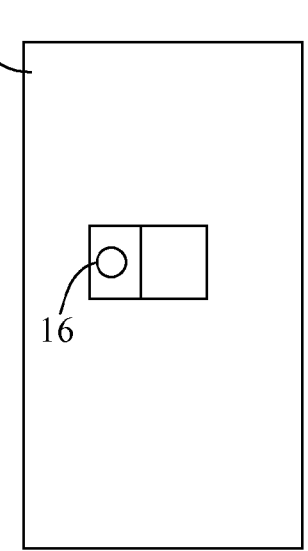
Fig. 1　　　　Fig. 2　　　　Fig. 3
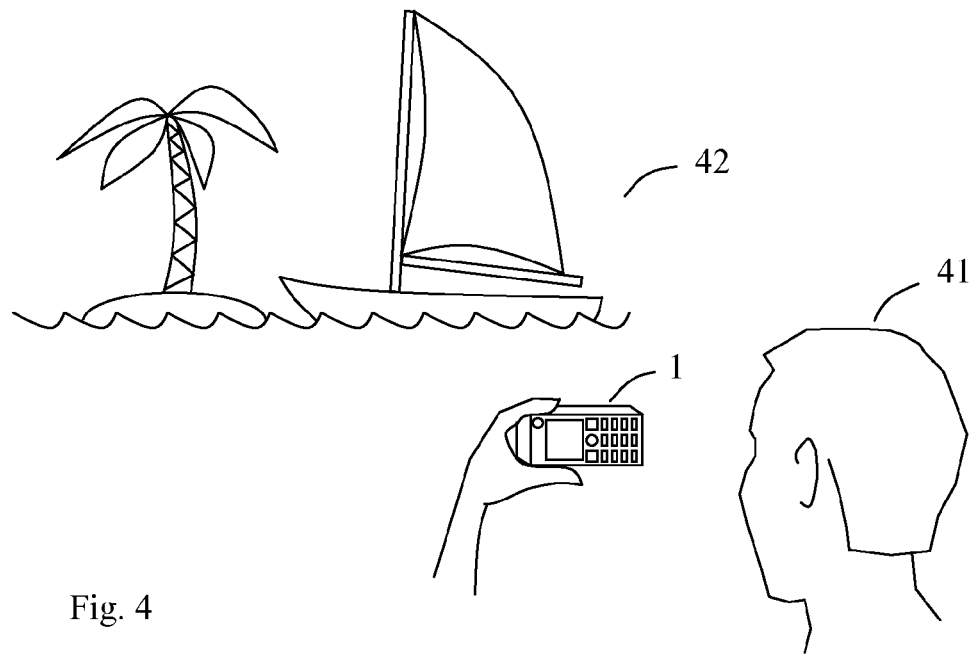
Fig. 4

DEVICE AND METHOD FOR ADJUSTING IMAGE ORIENTATION

FIELD OF INVENTION

The present invention relates to the art of digital photography, specifically to digital camera devices and methods for image processing in camera devices. More particularly, the invention relates to a solution for adjusting image rotation orientation of images captured by the camera device, such that captured images may be stored in a common orientation regardless of how the camera device is oriented when the image was captured. The invention makes use of a secondary camera for establishing camera orientation, and is suitable for implementation in a camera phone configured for video conferencing.

BACKGROUND

Digital cameras have increased tremendously in popularity over the last decade, as high quality image sensor cameras have become affordable. Miniaturization of both optics and electronics have resulted in extremely compact camera modules, and it has therefore become a common approach to introduce digital cameras in mobile phones. Initially, still image cameras were employed, but also video recording cameras are commonly included in state of the art mobile phones. A mobile phone with a built in digital camera is often referred to as a camera phone.

For the purpose of capturing high quality images, i.e. still pictures or video, the mobile phone is often equipped with a primary built in camera with an image sensor of several mega pixels. When operating the primary camera, the display is typically used as a viewfinder, by presenting the images presently captured by the primary camera. The primary camera is therefore normally aimed in the opposite direction of the display. Upon pushing a button or similar, a snapshot may be taken, or a video recording may be initiated. Captured images may be stored in a memory of the phone, and shared with other users, e.g. by presenting them on a display or by sending an mms.

Since the introduction of the so called $3^{rd}$ generation (3G) type of mobile telephony systems, such as WCDMA, mobile video conferencing services have also been developed. In a typical mobile video conferencing scenario, a user captures a video signal of his or her own face with a built in camera, and sends the video signal to a remote party, while a video signal received from the remote party is presented on a display of the phone. Normally, a small image of the signal captured of the user's own face is simultaneously presented in a smaller frame of the display, so as to guarantee that the camera is properly aimed. A separate video conference camera, or secondary camera, is therefore typically included. The secondary camera is aimed in a direction substantially common with a normal viewing direction of the display, and therefore also in a substantially opposite direction compared to the primary camera. Video conferencing systems are often defined to make use of a fairly low resolution, such as VGA or QCIF, in order to minimize the required communication bandwidth, and the video conference camera may therefore be fairly simple.

Digital images captured by a primary camera of a mobile phone are presented on the display of the phone, or on a connected external computer screen. The user is often free to compose images in any way, including changing the orientation of the camera. Horizontal or "landscape" orientation is displayed correctly on the display. However, when using a vertical or "portrait" orientation, the image is still saved to file in the orientation used, which means that it will be displayed as rotated by 90 degrees. In many mobile phones the user has an option to use a software application to rotate the image in the correct direction. However, this is a manual operation and can be quite time-consuming if many images have been captured. If it is not done, viewing a slideshow of the images means that you have to rotate the phone when ever the orientation of the images change. If you are viewing the images on a computer screen or a TV, this operation becomes almost unthinkable.

The problem of image orientation in digital cameras is not confined to the art of mobile phones, but to digital cameras as such, and different solutions for more or less automatic image orientation adjustment in digital cameras as such have been suggested.

U.S. Pat. No. 5,900,909 to Parulski et al. discloses an electronic still camera provided with an electronic image sensor for generating an image signal corresponding to a still image of a subject and an orientation determination section for sensing the orientation of the camera relative to the subject. The orientation determination section provides an orientation signal recognizing either the vertical or the horizontal orientation of the camera relative to the subject. An image processor is responsive to the orientation signal for processing the image signal and correcting the orientation thereof so that the still image is output from the image processor in a predetermined orientation. In this way, the electronic still camera can be positioned in a variety of orientations relative to a subject, including both clockwise and counterclockwise vertical "portrait" orientations and a horizontal "landscape" orientation, without affecting the orientation of the images output by the camera. In order to determine the orientation of the camera, an orientation sensor is included in the camera, in the form of mercury-filled switches or photo-interrupter type switches.

US 2004/0017506 A1 to Livingston discloses a similar approach, in which a camera includes a camera orientation sensing system configured to determine the orientation of the camera, the sensing system including an orientation sensor that is fixedly positioned relative to the camera body in an angled orientation such that the longitudinal axis of the sensor is not parallel to either of the horizontal or vertical axes of the camera body. Each orientation sensor typically includes a gravity-sensitive switch, such as a mercury-filled switch.

However, any inclusion of physical auxiliary means for orientation detection, such as switches, also involves increased cost and requires some space within the camera device in question.

SUMMARY OF THE INVENTION

A general object of the invention is to provide improved means for orientation adjustment of digital images captured by a digital camera device.

According to a first aspect of the invention, this object is fulfilled by means of a camera device, comprising:

a support structure;

a primary camera carried by the support structure;

a secondary camera carried by the support structure;

an orientation detector connected to the secondary camera, configured to identify images features in an image captured by the secondary camera, and to determine rotation orientation of the image relative to a reference orientation;

a data storing device configured to store image data of images captured by the primary camera in an orientation dependent on determined rotation orientation.

In one embodiment the primary camera has a primary field of view, and the secondary camera has a secondary field of view which does not overlap with the primary field of view.

In one embodiment the primary camera has a primary field of view, and the secondary camera has a secondary field of view, wherein the primary field of view and the secondary field of view are aimed in substantially opposite directions.

In one embodiment the camera device comprises a display device carried by the support structure, configured to act as a viewfinder for the primary camera, and having a normal viewing direction lying within a field of view of the secondary camera.

In one embodiment the orientation detector is configured to identify three or more features from an image captured by the secondary camera.

In one embodiment the orientation detector is configured to identify image features of a human user.

In one embodiment the image features includes facial features.

In one embodiment the image features includes an eye.
In one embodiment the image features includes a mouth.
In one embodiment the image features includes a chin.
In one embodiment the image features includes an eyebrow.

In one embodiment the camera device comprises an image recording trigger, configured to activate the data storing device to store image data of an image captured by the primary camera, and the orientation detector to identify images features and determine the rotation orientation of an image captured by the secondary camera.

In one embodiment the orientation detector is configured to detect the orientation of a captured image relative to a vertical orientation and a horizontal orientation, and to determine that the support structure is either vertically oriented or horizontally orientated dependent on which of these orientations matches closest with the captured image of the secondary camera.

In one embodiment the data storing device is configured to store image data in the orientation as captured by the primary camera, or rotated in one or more steps of 90° as determined by the orientation detector.

In one embodiment the camera device is incorporated in a mobile phone.

According to a second aspect, the stated object is fulfilled by means of a method for adjusting image orientation in a camera device, comprising the steps of:

capturing an image using a primary camera carried by a support structure;

capturing an image using a secondary camera carried by the support structure;

identifying image features in the image captured by the secondary camera, determining rotation orientation of the image captured by the secondary camera relative to a reference orientation;

storing image data of the image captured by the primary camera in a memory in an orientation dependent on determined rotation orientation.

In one embodiment the method comprises the step of:

arranging the primary and the secondary cameras on the support structure such that a primary field of view of the primary camera does not overlap with a secondary field of view of the secondary camera.

In one embodiment the method comprises the step of:

aiming the primary camera and the secondary in substantially opposite directions.

In one embodiment the method comprises the steps of:

aiming the primary camera towards an object;

aiming the secondary camera towards a user of the camera device.

In one embodiment the method comprises the steps of:

presenting an image of an object as captured on a display device carried by the support structure, acting as a viewfinder for the primary camera;

aiming the secondary camera towards a user of the camera device in a viewing direction of the display.

In one embodiment the method comprises the step of:

identifying three or more features from an image captured by the secondary camera.

In one embodiment the method comprises the step of:

identifying image features of a human user.

In one embodiment the image features includes facial features.

In one embodiment the image features includes an eye.
In one embodiment the image features includes a mouth.
In one embodiment the image features includes a chin.
In one embodiment the image features includes an eyebrow.

In one embodiment the method comprises the steps of:

activating an image recording trigger, and responsive to said activation determining the relative rotation orientation of the image captured by the secondary camera, and storing image data of an image captured by the primary camera in an orientation dependent on the determined relative orientation.

In one embodiment the method comprises the steps of:

detecting the orientation of an image captured by the secondary camera relative to a vertical orientation and a horizontal orientation;

determining that the support structure is either vertically oriented or horizontally orientated dependent on which of these orientations matches closest with the captured image of the secondary camera.

In one embodiment the method comprises the step of:

storing image data in the orientation as captured by the primary camera, or rotated in one or more steps of 90° corresponding to the determined rotation orientation.

BRIEF DESCRIPTION OF DRAWING

The features and advantages of the present invention will be more apparent from the following description of the preferred embodiments with reference to the accompanying drawing, on which FIG. 1 schematically illustrates a front view of a camera device in the form of a camera phone, where the front side includes a display and a secondary, video conference camera;

FIG. 2 illustrates a side view of the camera device of FIG. 1;

FIG. 3 schematically illustrates a rear view of the camera device of FIGS. 1 and 2, where the read side includes a primary camera;

FIG. 4 schematically illustrates a scenario where a user operates a camera device of FIGS. 1-3 for capturing an image of an object in a portrait orientation, by holding the camera device rotated approximately 90° from the orientation depicted in FIG. 1;

DETAILED DESCRIPTION OF PREFERRED EMBODIMENTS

The present description relates to the field of camera devices including digital cameras. A preferred embodiment of the invention relates to a communication device configured for video telephony, such as a 3G mobile phone. The invention is particularly suitable for mobile phones, but is as such equally applicable to digital camera devices which do not include radio communication capabilities. However, for the sake of clarity and simplicity, most embodiments outlined herein are related to mobile phones. Furthermore, it should be emphasized that the term comprising or comprises, when used in this description and in the appended claims to indicate included features, elements or steps, is in no way to be interpreted as excluding the presence of other features elements or steps than those expressly stated.

Preferred embodiments will now be described with reference to the accompanying drawings.

Figure 12:
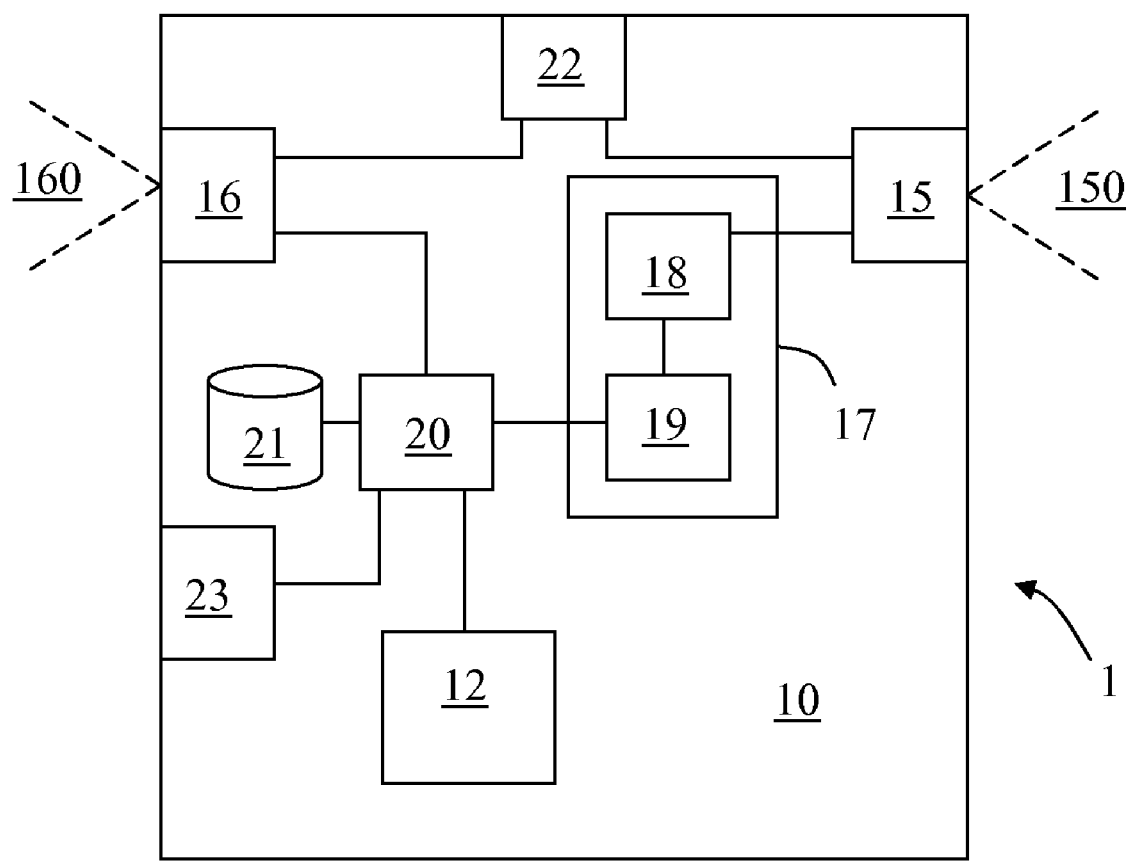
FIG. 12 schematically illustrates a block diagram of functional features of a camera device in accordance with an embodiment of the invention.

A camera device 1 configured in accordance with an embodiment of the invention is shown from three different angles in FIGS. 1-3, and in the form of a block diagram in FIG. 12. The camera device 1 is a portable radio communication device, or mobile telephone, and comprises a support structure 10 including a housing and a chassis, arranged to support other elements of the device. A user interface includes a keypad or keyboard 11 and a display 12. Typically, the device 1 also includes an audio interface including a microphone 13 and a speaker 14, as well as radio transceiver circuitry and antenna 23, even though these elements are not of importance for the invention and can be dispensed with if the invention is employed in an ordinary digital camera. Normally a battery (not shown) is also included. A microprocessor system 20 includes a signal processor with associated software and data memory for image signal processing, and the same or an auxiliary processor for radio signal encoding and decoding purposes. The specific function and design of the electronic device as a communication device is as such of little importance to the invention, and will therefore not be described in any greater detail. It should also be noted that the list of features and elements included in the camera device 1 is in no way exhaustive. On the contrary, while the camera device 1 shown and described represent only one possible embodiment, it may well comprise further features and elements providing other functions.

However, apart from the elements outlined above, the camera device 1 also includes a primary digital camera 16, an aperture of which is indicated in FIG. 3. A secondary camera 15 is also included, positioned adjacent to display 12, and aimed such that its field of view (FOV) 150 is likely to cover a user watching display 12. The primary camera 16 is aimed such that its FOV 160 does not overlap the FOV 150 of the secondary camera 15. Preferably, the two cameras 15 and 16 are aimed at substantially opposite directions, but they may optionally be directed approximately 90° to each other. It is in fact not essential that the two cameras 15 and 16 have fixed line of sights, primary camera 16 may indeed e.g. be rotatable in a socket in support structure 10 to some extent.

In FIG. 1 a vertical axis z and a horizontal axis x are defined for the camera device 1. More specifically, the y axis represents the longitudinal direction of the camera device 1. If a snapshot or a video segment is recorded using primary camera 16 when the camera device 1 is held as shown in FIG. 1, i.e. with the y axis held vertically, a landscape orientation image is generally recorded. Typically, the image is also stored in an image data memory 21 in the landscape orientation. It should be noted, though, that this depends on how the camera detector is oriented in the camera device. It may therefore be the other way around, namely that a portrait orientation image is recorded when the y axis is held vertically. In that case, the image is also stored in the portrait orientation.

FIG. 4 illustrates a different scenario, where a user 41 operates a camera device 1 to capture an image, snapshot or video, of a scene or object 42. In this case, the user 41 has chosen to make use of a portrait orientation, and has therefore rotated camera device 1 approximately 90° counter clockwise, such that horizontal axis x of camera device 1 now points vertically upwards. If no particular measures are taken, the image captured will also be stored in this orientation in memory 21. However, a target of the present invention is to have all images stored in a common rotation orientation, in order to facilitate later presentation of the images on display 12 or on another display. In accordance with an embodiment of the invention, secondary camera 15 is used to determine the orientation of the camera device 1 when capturing images. This is particularly useful in mobile phones 1 that support video telephony, where a video telephony camera (VTC) 15 is included. The VTC 15 is normally directed towards the face of the user 41 and is configured to capture images either continuously, or only in connection to the capture of a snapshot with the primary camera 16. The present orientation of camera device 1 is then determined by analyzing the image captured by the secondary camera 15, and the determined orientation is subsequently used to manipulate the image captured by the primary camera 16, so as to rotate it to a predetermined common image orientation with the vertical axis of the image aligned with the vertical axis of the camera device 1.

The present orientation of camera device 1 is determined by identifying at least two features in the image captured by the secondary camera. Preferably, three features in the face of the user 41 are identified. Theses features preferably include the eyes and mouth of the user. Alternatively, though, other features may be identified if they are better suited for the purpose, such as the chin, the nose, the ears, or the hairline. Three features are preferably identified in the image, in order to determine in which direction the camera device 1 is rotated. With only two features, it becomes difficult to discriminate between clockwise and counter-clockwise rotation. Numerous software-based processes for facial feature identification and recognition purposes have been presented in papers and in real products, and several patents have been granted within this field. As a mere example, A. W. Senior presented "Face and Feature Finding for a Face Recognition System" In proceedings of Audio- and Video-based Biometric Person Authentication '99, pp. 154-159. Washington D.C. USA, Mar. 22-24, 1999. As another example, U.S. Pat. No. 5,933,527 to Ishikawa discloses a facial image processing method and apparatus, by means of which areas of facial features may be extracted, and coordinate data related to those areas can be extracted.

An embodiment of a process for image rotation orientation adjustment in accordance with the invention will now be described with reference to the drawings, based on the scenario illustrated in FIG. 4.

Figure 5:
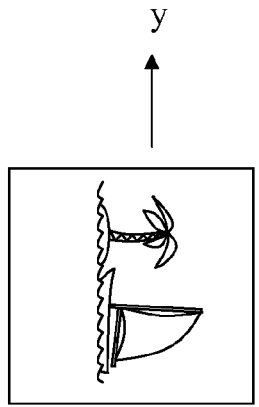
FIG. 5 schematically illustrates an image captured with the primary camera in the scenario of FIG. 4, where the image is shown in the orientation as captured.

FIG. 5 shows how the image captured of object 42 is oriented in an image plane of the primary camera 16, with reference to axes x and y of camera device 1.

Figure 6:
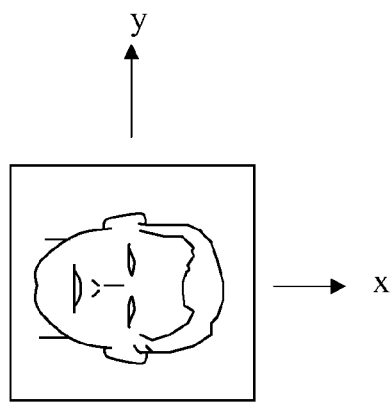
FIG. 6 schematically illustrates an image of the user of the camera device, captured by the secondary camera in near time or simultaneously with the image of FIG. 5.

When the image of FIG. 5 is captured by means of primary camera 16, an auxiliary image of the user 41 is captured by means of secondary camera 15, this image being shown in FIG. 6. If the image of FIG. 5 is a still image, i.e. a snapshot, the image of FIG. 6 is preferably captured simultaneously, or at least within near time, e.g. within a second, as the image of FIG. 5. An image recording trigger 22, typically a pushbutton or the like, is therefore operatively connected to both cameras 15 and 16, wherein activation of the trigger causes both the primary camera 16 and the secondary camera 15 to record images within the respective FOV 160 and 150. If the image recorded with the primary camera 16 is a video segment, and the user decides to rotate the camera device 1 during the shooting of the video segment, no particular adjustment is preferably made to compensate for such ongoing rotation. For that reason, the image of FIG. 6 is preferably a snapshot captured by secondary camera 15 upon initiating recording of the image of FIG. 5 with primary camera 16. In any case, as the camera device 1 is rotated upon taking or beginning to shoot the image of FIG. 5, the same goes for the image of FIG. 6. It should be noted that the x axis as shown in FIGS. 5 and 6 relate to how the images would have been presented on display 12 of camera device 1, and not to detector planes of the respective cameras, which preferably are aimed in substantially opposite directions.

Figure 7:
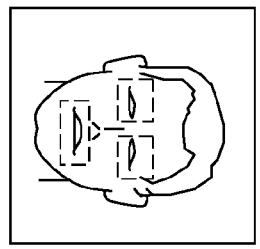
FIG. 7 schematically illustrates how selected features of the image of the user, such as the eyes and mouth, are identified by an image identifying function in the camera device.

The image of FIG. 6 is passed from secondary camera 15 to an orientation detector 17. The orientation detector 17 is preferably realized by means of software executed by a processor device, but is indicated in FIG. 12 as a functional element for the sake of simplicity and easy understanding of the process as such. Orientation detector 17 comprises an image feature detector 18, operable to analyze the image received to identify images features in an image captured by the secondary camera 15. This is illustrated in FIG. 7, where two eye portions and a mouth portion of the image have been detected and identified as eyes and mouth of the user.

Figure 8:
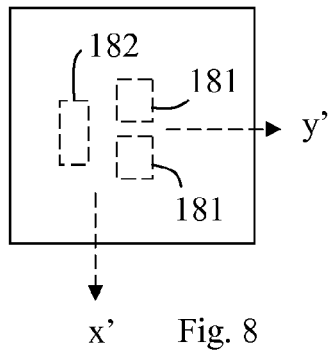
FIG. 8 illustrates how the identified features are associated with a normal vertical axis and horizontal axis of a face.

In FIG. 8, the image areas 181 representing the positions of the eyes, and 182 representing the position of the mouth, have been extracted from the image of the user. This does not mean that an image as shown in FIG. 8 must be generated, but that these are now the areas of interest in the image. Orientation detector 17 is preferably configured to detect facial image features, and is thereby configured to determine that a line passing through the eye portions 181 defines a baseline, whereas the position of mouth portion 182 relative to that baseline represents the lower part of the image. This way, a coordinate system for the captured image may be defined, where a horizontal image axis x' is parallel to the baseline, and a vertical image axis y' is orthogonal to the baseline, with the positive direction of the y' axis extending away from the position of the mouth area portion 182, as counted from the baseline.

A digital camera, for which the display is used as a viewfinder, is generally held at a certain distance to the face of the user when pictures are taken. However, in one alternative embodiment the camera device 1 also includes an optical viewfinder (not shown), which may or may not be guided through a lens of the primary camera 16. An optical viewfinder is particularly advantageous in strong sunlight conditions, when it is difficult to make out what is actually presented on display 12. In such an embodiment, the secondary camera 15 may also be positioned adjacent to the optical viewfinder, such that when the optical view finder is used an image of an eye portion of the user is captured. In such an embodiment, the camera device may also be configured to identify the eye and the eyebrow over that eye. The y' axis can then be defined as an axis passing substantially centrally through the eye and the eyebrow, in that direction.

Figure 9:
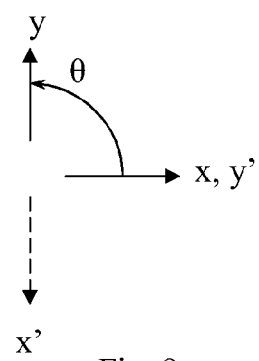
FIG. 9 schematically illustrate how the relative rotational orientation of the image is determined, compared to the orientation of the camera device.

In any case, the orientation of the image captured by secondary camera 15, in the image plane, is thereby determined in accordance with FIG. 8. In a calculator unit 19, the rotation orientation of the image is then determined relative to a pre-stored reference orientation. For the illustrated embodiment, where the features to identify are facial features, the reference position is preferably a vertical orientation of the face, which in FIG. 9 is represented by a vertical axis y and a horizontal axis x, corresponding to the vertical and horizontal axes of the camera device 1 as such. Calculator unit 19 is configured to calculate the rotational difference between the coordinate system of axis x', y' and the coordinate system of axis x, y, to determine a rotation angle θ.

In a preferred embodiment, the calculator unit 19 is configured to disregard deviations from a perfectly vertical or horizontal orientation of the camera device 1. In fact, any inclination from these two orthogonal orientations may indeed by up to the artistic freedom of the user. Furthermore, it can not be guaranteed that the user holds his or her head in a perfectly upright position. For these reasons, calculator unit 15 is preferably configured to output only rotation angles θ in steps of 90°, in order to produce an angle θ usable for transforming an image captured by primary camera 16 between landscape and portrait orientations, and to make distinction between up and down. The orientation detector is thereby configured to detect the orientation of a captured image relative to a vertical orientation and a horizontal orientation, and to determine that the support structure of the camera device 1 is either vertically oriented or horizontally orientated dependent on which of these orientations matches closest with the captured image of the secondary camera. As an example, should calculator unit 15 determine that the actual angle between y' and y is less than ±45°, the output value of θ is 0 (zero). In the same manner:

If 45°<θ<135°, then the output value of θ is set to 90°.
If 135°<θ<225°, then the output value of θ is set to 180°.
If 225°<θ<315°, then the output value of θ is set to 270°, i.e. −90°.

Figure 10:
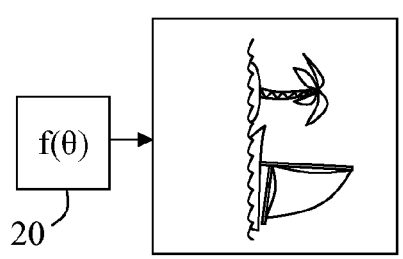
FIG. 10 schematically illustrates how an operator function is applied to the image captured by the primary camera, which operator function is dependent on the determined rotational orientation.
Figure 11:
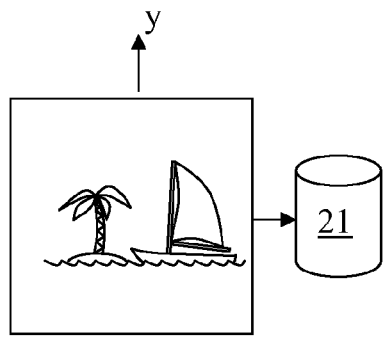
FIG. 11 schematically illustrates how the image captured by the primary camera has been adjusted by rotation, and is stored in a memory.

Orientation detector 17 outputs the output value of angle θ to microprocessor system 20, which is also connected to receive the image captured by primary camera 16. As illustrated in FIG. 10, processor system 20 thereby processes the image of primary camera 16 using an operator function f(θ), which logistically involves the operation of rotating the image captured by primary camera 16 by the received angle θ. The result is illustrated in FIG. 11, from which it is evident that the image as captured has been rotated by approximately 90°, as detected by orientation detector 17. The rotated image is stored in an image data memory 21 in the camera device 1. Needless to say, the memory 21 does not have to be permanently attached to the camera device 1, it may e.g. just as well be arranged on an insertable IC memory card.

The presented solution is different from existing solutions in that it assumes the use of a second camera as the orientation sensing device. A camera device 1 according to the present invention is therefore particularly suitable if the camera device 1 already includes two cameras 15, 16 for any other purpose anyway. A best mode of the invention known to date is therefore to employ the invention in a camera phone 1, i.e. a mobile phone, with a primary camera 16 for capturing high quality images and a secondary camera 15 for video telephony purposes. The advantage offered by the invention when applied in such a camera phone 1 is that it makes use of existing components to provide added value to the customer.

Various embodiments of the invention have been outlined above and specific examples have been described in detail with reference to the appended drawings. It should be noted, though, that the invention is not limited to these specific examples, but may in fact be modified within the scope defined by the claims.

I claim:

1. A camera device, comprising:
a support structure;
a primary camera carried by the support structure;
a secondary camera carried by the support structure;
an orientation detector connected to the secondary camera, configured to identify images features in an image captured by the secondary camera, and to determine rotation orientation of the image relative to a reference orientation;
a data storing device configured to store image data of images captured by the primary camera in an orientation dependent on the rotation orientation that was determined from the image captured by the secondary camera.

2. The camera device of claim 1, wherein the primary camera has a primary field of view, and the secondary camera has a secondary field of view which does not overlap with the primary field of view.

3. The camera device of claim 1, wherein the primary camera has a primary field of view, and the secondary camera has a secondary field of view, wherein the primary field of view and the secondary field of view are aimed in substantially opposite directions.

4. The camera device of claim 1, comprising a display device carried by the support structure, configured to act as a viewfinder for the primary camera, and having a normal viewing direction lying within a field of view of the secondary camera.

5. The camera device of claim 1, wherein the orientation detector is configured to identify three or more features from an image captured by the secondary camera.

6. The camera device of claim 1, wherein the orientation detector is configured to identify image features of a human user.

7. The camera device of claim 6, wherein the image features includes facial features.

8. The camera device of claim 6, wherein the image features includes an eye.

9. The camera device of claim 6, wherein the image features includes a mouth.

10. The camera device of claim 6, wherein the image features includes a chin.

11. The camera device of claim 6, wherein the image features includes an eyebrow.

12. The camera device of claim 1, comprising an image recording trigger, configured to activate the data storing device to store image data of an image captured by the primary camera, and the orientation detector to identify images features and determine the rotation orientation of an image captured by the secondary camera.

13. The camera device of claim 1, wherein the orientation detector is configured to detect the orientation of a captured image relative to a vertical orientation and a horizontal orientation, and to determine that the support structure is either vertically oriented or horizontally orientated dependent on which of these orientations matches closest with the captured image of the secondary camera.

14. The camera device of claim 1, wherein the data storing device is configured to store image data in the orientation as captured by the primary camera, or rotated in one or more steps of 90° as determined by the orientation detector.

15. The camera device of claim 1, incorporated in a mobile phone.

16. A method for adjusting image orientation in a camera device, comprising the steps of:
capturing an image using a primary camera carried by a support structure;
capturing an image using a secondary camera carried by the support structure;
identifying image features in the image captured by the secondary camera,
determining rotation orientation of the image captured by the secondary camera relative to a reference orientation;
storing image data of the image captured by the primary camera in a memory in an orientation dependent on the rotation orientation that was determined from the image captured by the secondary camera.

17. The method of claim 16, comprising the step of:
arranging the primary and the secondary cameras on the support structure such that a primary field of view of the primary camera does not overlap with a secondary field of view of the secondary camera.

18. The method of claim 16, comprising the step of:
aiming the primary camera and the secondary in substantially opposite directions.

19. The method of claim 16, comprising the steps of:
aiming the primary camera towards an object;
aiming the secondary camera towards a user of the camera device.

20. The method of claim 16, comprising the steps of:
presenting an image of an object as captured on a display device carried by the support structure, acting as a viewfinder for the primary camera;
aiming the secondary camera towards a user of the camera device in a viewing direction of the display.

21. The method of claim 16, comprising the step of:
identifying three or more features from an image captured by the secondary camera.

22. The method of claim 16, comprising the step of:
identifying image features of a human user.

23. The method of claim 21, wherein the image features includes facial features.

24. The method of claim 21, wherein the image features includes an eye.

25. The method of claim 21, wherein the image features includes a mouth.

26. The method of claim 21, wherein the image features includes a chin.

27. The method of claim 21, wherein the image features includes an eyebrow.

28. The method of claim 16, comprising the steps of:
activating an image recording trigger, and responsive to said activation
determining the relative rotation orientation of the image captured by the secondary camera, and
storing image data of an image captured by the primary camera in an orientation dependent on the determined relative orientation.

29. The method of claim 16, comprising the steps of:
detecting the orientation of an image captured by the secondary camera relative to a vertical orientation and a horizontal orientation;
determining that the support structure is either vertically oriented or horizontally orientated dependent on which of these orientations matches closest with the captured image of the secondary camera.

30. The method of claim 16, comprising the step of:
storing image data in the orientation as captured by the primary camera, or rotated in one or more steps of 90° corresponding to the determined rotation orientation.

* * * * *